United States Patent
Franke et al.

(10) Patent No.: US 6,243,788 B1
(45) Date of Patent: Jun. 5, 2001

(54) CACHE ARCHITECTURE TO ENABLE ACCURATE CACHE SENSITIVITY

(75) Inventors: Hubertus Franke, Cortlandt Manor; Pratap Chandra Pattnaik, Ossining, both of NY (US); Orran Yaakov Krieger, Brookline, MA (US); Yurij Andrij Baransky, Montrose, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/098,988

(22) Filed: Jun. 17, 1998

(51) Int. Cl.⁷ .................................................. G06F 12/00
(52) U.S. Cl. .............................................. 711/3; 709/102
(58) Field of Search ............................ 711/3, 120; 712/1; 709/104, 106, 102

(56) References Cited

U.S. PATENT DOCUMENTS

| | | | | |
|---|---|---|---|---|
| 4,985,831 | * | 1/1991 | Dulong et al. | 709/106 |
| 5,185,861 | * | 2/1993 | Valencia | 711/120 |
| 5,287,508 | * | 2/1994 | Hejna, Jr. et al. | 709/102 |
| 5,553,305 | * | 9/1996 | Gregor et al. | 709/106 |
| 5,745,778 | * | 4/1998 | Alfieri | 712/1 |
| 5,974,438 | * | 10/1999 | Neufeld | 709/104 |

* cited by examiner

Primary Examiner—Do Hyun Yoo
Assistant Examiner—Nasser Moazzami
(74) Attorney, Agent, or Firm—Douglas W. Cameron; Anne Vachon Dougherty

(57) ABSTRACT

A technique of monitoring the cache footprint of relevant threads on a given processor and its associated cache, thus enabling operating systems to perform better cache sensitive scheduling. A function of the footprint of a thread in a cache can be used as an indication of the affinity of that thread to that cache's processor. For instance, the larger the number of cachelines already existing in a cache, the smaller the number of cache misses the thread will experience when scheduled on that processor, and hence the greater the affinity of the thread to that processor. Besides a thread's priority and other system defined parameters, scheduling algorithms can take cache affinity into account when assigning execution of threads to particular processors. This invention describes an apparatus that accurately measures the cache footprint of a thread on a given processor and its associated cache by keeping a state and ownership count of cachelines based on ownership registration and a cache usage as determined by a cache monitoring unit.

7 Claims, 6 Drawing Sheets

CACHE ARCHITECTURE TO ENABLE ACCURATE CACHE SENSITIVITY

TECHNICAL FIELD

This invention relates to scheduling threads in a computer system. In particular, this invention relates to methods and systems for facilitating the tracking of cache footprints of threads, for the purpose of cache sensitive scheduling.

DESCRIPTION OF THE PRIOR ART

In modern computer architectures, the speed of the CPU is progressively scaling up much faster than the memory access speed. It therefore has become increasingly important to deal with the effects of memory latency. To mitigate the relatively high memory access time, computer systems, as shown in FIG. 1, interpose larger and larger sized caches (14a,14b) between the $\mu P$ (12) and the memory (13) and often even multiple levels of caches are deployed (14,15) [1]. Nevertheless, the discrepancy in CPU speed increase to memory access speed increase results in greater cache reload time, in terms of CPU cycles, in the case a cache miss occurs. Various techniques are known to hide cache misses such as instruction dependency analysis, speculative execution, out-of-order execution and prefetching [1]. With the increasing discrepancy between cache access time and memory latency, it will become increasingly difficult to hide cache misses using these techniques. As a result, $\mu$Ps will experience more stalls, thus increasing the average number of cycles required to execute an instruction (cpi). In order to keep a computer system's cpi low, it is therefore important to reduce the number of cache misses a $\mu P$ suffers.

Cache misses typically occur due to limited cache resources, where the working set of the active threads on a processor can not be presented in its entirety in the cache. In this case, switching among the threads will result in cache misses because memory accessed by one thread will evict the cache content of other threads. One obvious way to alleviate this problem is to increase the time quantum of executing threads, thus increasing the probability of cache reuse during that longer period. However, increasing the time quantum has adverse effects in terms of other system parameters, such as response time, and hence, this is not generally an option.

Today, many, or even most, modern server systems are cache coherent shared memory multiprocessor systems (MPs) (11), where multiple processors (12a,12b) are linked to one or more memory modules (13) [1]. In these systems, cache misses occur when a thread's execution migrates from one processor to another, yet part of its accessed memory is still cached on the previous processor's cache. Upon access of these memory locations, cache misses occur resulting in the transfer of cache-lines to the new processor. Schedulers on such systems can improve both throughput and responsiveness by considering not only the priority of the threads being scheduled, but also the affinity of threads to the different processors [2,4,5,6]. If threads are typically scheduled to processors to which they have a high affinity, then the overall number of cache misses are reduced, and hence throughput is increased. Minor delays in scheduling a thread so as to schedule the thread on a processor to which it has affinity can actually increase the responsiveness of the thread, since when the thread does get to run, the processor will spend less time reestablishing its cache contents. While many multiprocessor schedulers do attempt some form of affinity based scheduling, the effectiveness of this scheduling is limited, since there is no way for the scheduler to make accurate estimates of cache affinity.

The first attempt in operating systems and still the one that is most widely spread in commercial operating systems for multiprocessor systems is the use of virtual time stamps. Here, upon execution of a thread T on processor $P_i$ a per-processor time stamp is assigned to the thread. Threads with the highest time stamp for a given processor are assigned a higher affinity value. Often very simple implementations are provided for this concept, namely a value of "1" if the thread ran here last or "0" otherwise. This method does not take the cache footprint of a thread into account. It assumes, often incorrectly, that a thread most recently run on a processor has the highest affinity to that processor.

Many processors have introduced mechanisms to account for the number of cache misses during a set interval, and operating systems are starting to utilize this information [3,4,5,6]. In the minimum misses strategy the scheduler remembers the number of cache misses a thread suffered during its last run. The lower the number of cache misses for a given thread, the higher is it's assigned cache affinity. A more elaborate strategy is based on the cache reload transient model. The Reload Transient is defined as the cost to reestablish the footprint of a thread after restarting it. A Markov Chain Model can be used to estimate the footprint of a thread at a given time [3,5,6]. In particular, the markov chain models the probabilities of increasing the number of active cachelines as a consequence of a cache miss during a thread's execution. For instance, assuming a system with N cachelines and a running thread T currently holding M cachelines, the probability that a cache miss increases T's cache footprint (i.e. none of T's cachelines were replaced by the miss) is (N−M)/N. The chain is then constructed by applying the same logic for more than one cache miss. Similarly, the same model can be used to estimate the reduction in a thread's cache footprint given the number of cache misses since the thread's last execution. At the time of scheduling it then makes sense to select the thread with the lowest reload transient, as we expect it to suffer the least cache misses to restore its previous state. This strategy assumes the system to be markovian, that is history less, which might not accurately reflect a thread's behavior nor reflect the cache hardware restrictions, such as cache associativity [1]. Furthermore, since the cache footprint is incrementally estimated over the lifetime of the thread this model can get out of sync, resulting in poor scheduling decisions.

The main impediment of current affinity based scheduling schemes, as described above, is that the cache affinity function is either based on very simple heuristics, e.g. virtual time stamps, or they are based on cache footprint estimations, e.g. stochastically models such as markov chains.

What is required, therefore, is an operating system with improved cache affinity based scheduling that is based on accurate cache footprint measurements.

REFERENCES

1. J. L. Hennessy, D. A. Patterson, "Computer Architecture: A Quantitative Approach," Morgan Kaufmann Publishers, ISBN 1-55860-329-8, 1996.
2. U. Vahalla, "UNIX Internals: The New Frontier," Prentice Hall, ISBN 0-13-101908-2, 1996.
3. D. Thiebaut, H. Stone, "Footprints in the Cache," ACM Transactions on Computer Systems, 5(4), November 1987, pp. 305–329.
4. M. Squillante, E. Lazowska, "Using Processor Cache Affinity in Shared-Memory Multiprocessor Scheduling," IEEE Transactions on Parallel and Distributed Systems, 4(2), February 1993, pp. 131–143.

5. A. Tucker, "Efficient Scheduling on Multiprogrammed Shared Memory Multiprocessors," Ph.D. Thesis, Department of Computer Science, Stanford University, CX-TN-94-4, December 1993.

6. F. Belossa, "Locality-Information-Based Scheduling in Shared-Memory Multiprocessors," IPPS'96 Workshop on Job Scheduling Strategies for Parallel Processing, Honolulu, Hi., April 1996.

References 1 through 6 above are hereby incorporated herein by reference.

SUMMARY OF THE INVENTION

It is an object of this invention to provide improved cache affinity based scheduling. Accordingly, this invention provides a method and apparatus for scheduling threads in a multiprocessor system by measuring a cache footprint for each of the threads for each of the processors. Then, the affinity for each of the threads for each of the processors is determined using the cache footprint determined above. The execution of each of the threads on each of the processors is then scheduled in accordance with the affinity. In a more specific embodiment of this invention, the cache footprint for each thread for each of the caches is measured by the number of active cachelines that are fetched by each thread from a particular cache.

BRIEF DESCRIPTION OF THE PREFERRED EMBODIMENT

Figure 1:
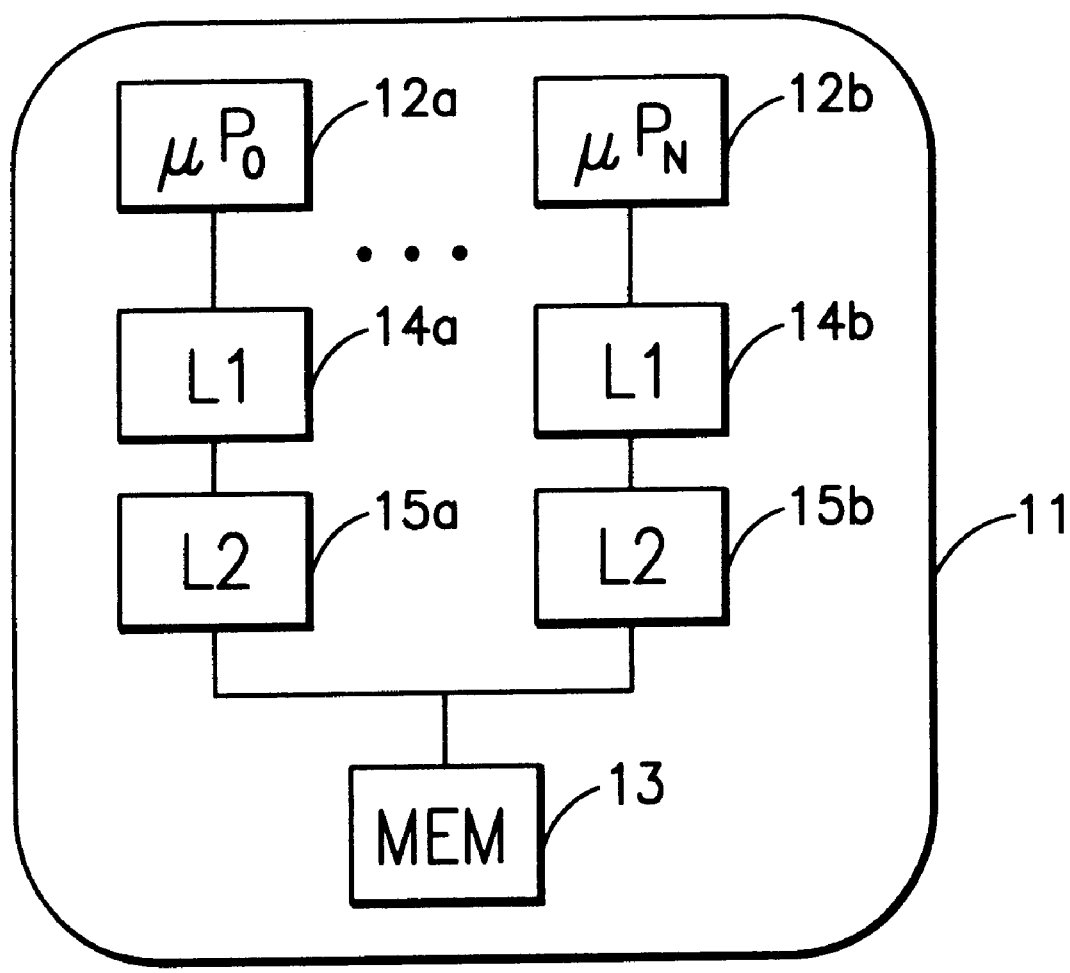
FIG. 1 schematically illustrates a shared memory multiprocessor with an integrated cache architecture.

As discussed above, FIG. 1 depicts an exemplary multiprocessor system (11) having a plurality of processors or CPUs (12a . . . 12b). Each processor is connected to a storage medium, short memory (13), that holds and/or supports application and operating system software. Interposed into the communication path of processor and its associated memory is at least one respective cache (14a, 14b), though multiple levels of caches (14a, 14b, 15a, 15b) are possible. The purposes of said caches is to temporarily store frequently accessed content of said memory and provide a faster communication path to said cached memory content, in order to provide faster memory access.

Figure 2:
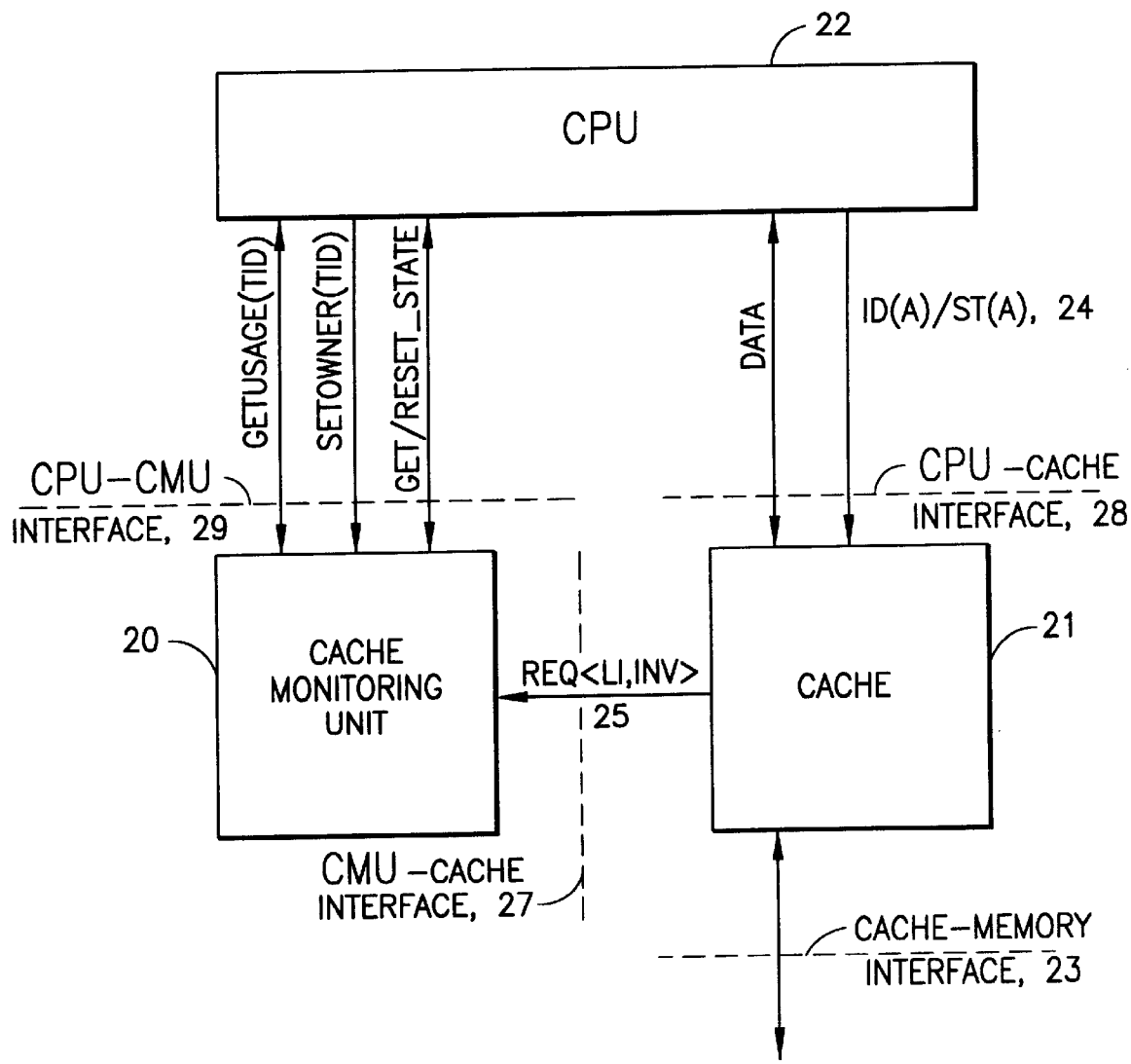
FIG. 2 is a high level schematic of the cache architecture integrated with the multiprocessor system of the invention.

In accordance with the present invention as illustrated in FIG. 2, the standard cache architecture is extended by a cache monitoring unit (20) (CMU). As the name indicates, the purpose of this extension is to monitor and attribute ownership and usage of the cache for the purpose of measuring the cache footprint of a computational unit (process, thread). FIG. 2 gives a high level overview of the integration and interaction of the CMU with the other standard system components, i.e. cache (21), CPU (22), and memory (23). When the current thread, executing its instruction stream on the CPU, accesses the content of memory location A (M[A]) via load or store operations ld(A)/st(A) (24), the CPU issues these requests towards its associated cache (21) through the CPU-Cache-Interface (28). The task of the cache is then to (a) identify whether the M[A] is already in the cache's storage and then return the data to the CPU or (b) whether the M[A] has to be fetched from main memory first before performing said task (a). In case M[A] is already in the cache's memory, M[A] is returned to the CPU without accessing the memory. No interaction with the CMU is required at this point. If however, M[A] is not available in the cache's memory, the cache must fetch the data from the memory unit through the cache-memory interface (23). Since the cache's memory is significantly smaller than the main memory, the cache has to make space or "evict" other cached memory in order to store M[A]. Caches are organized into a finite number (NUM_CL) of cachelines, where each cacheline holds a specific number of consecutive bytes of memory, referred to as the cacheline size (CLS). Caches typically organize multiple cachelines into groups based on a simple mapping function F(A) (e.g. address bit hashing). In other words, M[A] can only be stored in a cacheline falling into their associated cacheline group CG[A]. If none of the cachelines in CG[A] are available, the cache must evict a cacheline out of CG[A]. Evicting a cache-line incorporates a write-back to the memory in case the cacheline is in a modified state, i.e. memory and cache content are out of sync. Only then can M[A] be fetched into the newly freed cacheline. The organization and eviction mechanisms are standard practice in current cache deployment [1].

In accordance with another aspect of this invention, however, a notification of what line was evicted and what line was filled with some memory content is required from the cache. In order to enable the CMU to provide accurate cache footprint measurements at any given time, these notifications should take place immediately when the evict or fill event takes place. These additional operations can be performed in parallel and do not introduce any additional overhead on the critical path of accessing the cache. In particular, once the cache decided to evict cache-line $L_i$, the cache issues an "evict($L_i$)" notification on the cache-CMU communication bus ($C^3$-Bus) (27), and once the cache fills a cacheline a "filled($L_i$)", notification is sent to the CMU.

For all practical purposes, with the exception of a cacheline invalidate and the initial CMU state, all evictions are followed by a filling of the same cacheline. Hence, the "evict($L_i$)" and the "filled($L_i$)" can be lumped together into one request. The invalidate instructions can be covered by an additional parameter INV to the request (in hardware this is an additional signal line which is raised when a cache invalidate instruction is issued). Hence, each request issued from the cache to the CMU has the form Req<L,Inv>, where L identifies the line that is effected and Inv identifies whether this request is the result of an invalidate instruction or the result of a cacheline filling (implying an evict).

A method is now described that utilizes the notification requests from the cache and enables the CMU to provide for each of said threads the measure of how many cachelines fetched by each of said threads are still active in the cache.

The CMU picks up and acknowledges each notification request Req<L,Inv>(for instance by lowering a particular signal on the $C^3$-Bus). Besides the CMU-Cache interface, the CMU provides an interface to the CPU (29) which exposes the following two "instructions" to modify and query the state of the CMU:

1) setowner(oid): identifies the owner of all cachelines that are fetched from here on until another "setowner (oid)" is issued. oid must be a valid ID (see below).

2) getusage(oid): retrieves the number of cachelines that are owned by the valid oid.

As a valid oid we assume the following constraint: [0<oid<MAX_OID], with MAX_OID to be some system constant and 0 being reserved for dealing with the INV case and the initial state of the CMU. For the purpose of simplifying the discussion of this embodiment at this point, we assume that the number of possible owners (e.g. threads, processes) does not exceed MAX_OID. The case were the number of possible owners does exceed MAX_OID will be described later.

For each valid oid, and not only for the current owner, the CMU must maintain the number of cachelines "owned" by this oid, referred to as OC(oid). In order to be able to maintain such a count, the CMU must maintain for each cacheline $L_i$ the cacheline owner $CLO(L_i)$. In particular, for each request<L,Inv>received from the cache, the CMU decrements the counter associated with the current owner of the cacheline L and increments the counter associated with the new owner of the cacheline L as indicated by the last "setowner" instruction. Typically, the operating system will issues a "setowner" instruction to the CMU at the time of a context switch. If the Inv signal is raised in the request, "0" is chosen to be the new owner indicating that no owner is associated with the cacheline (note "0" is not a valid oid). Similarly at system startup time, all cachelines are attributed to oid "0".

Figure 3:
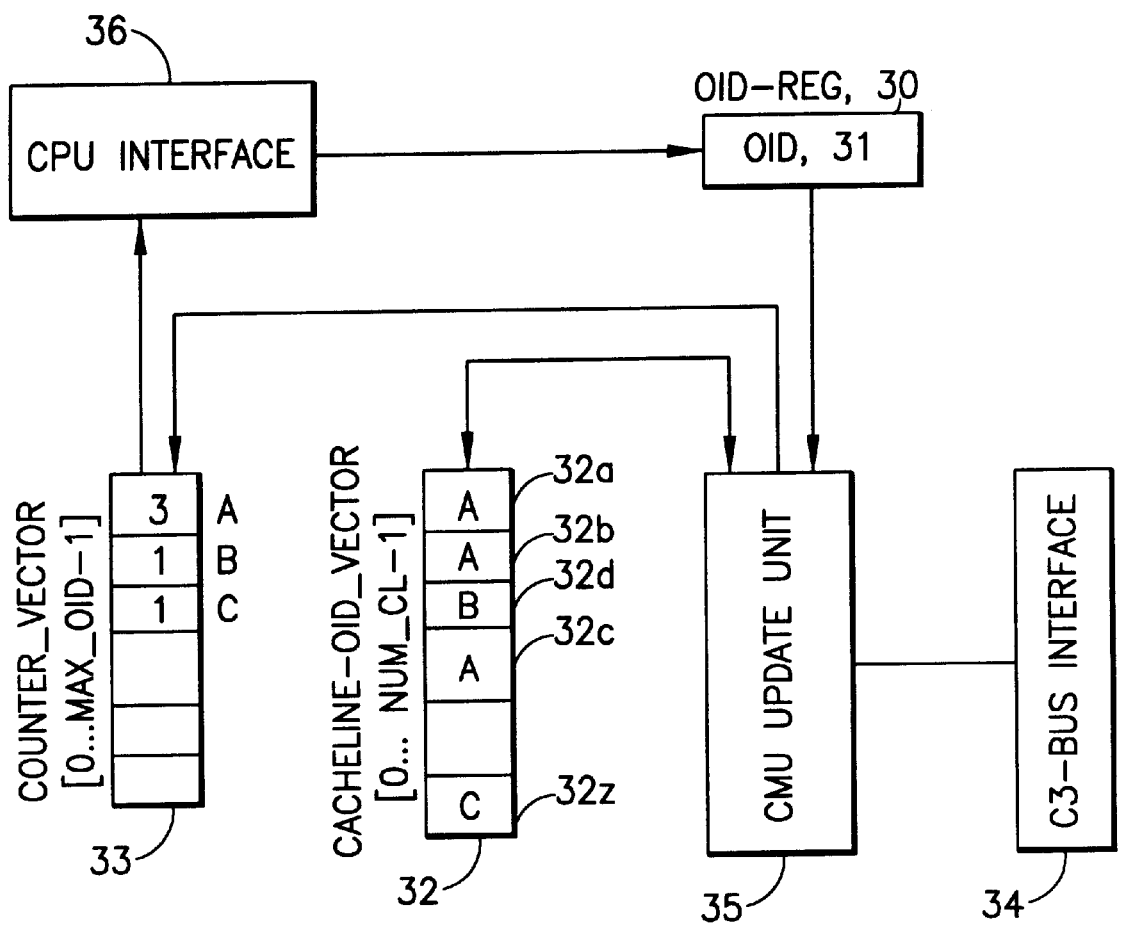
FIG. 3 schematically illustrates the internal architecture of the cache monitoring unit of this invention.

FIG. 3 illustrates in more detail the internal architecture of the CMU and attributes above requirements to the various CMU components listed in the following:

1. an owner identifier register oid-reg (30), which contains an oid (31) identifying the currently running owner (thread, process),
2. a cacheline-oid vector (32) of size NUM_CL, that for each cacheline $L_{[0 \ldots NUM\_CL-1]}$ (32a–z) holds the oid=$CLO(L_i)$ of the owner of the cacheline.
3. a counter vector (33), which maintains for each possible valid oid value the count of how many cachelines are owned by said oid.
4. a $C^3$-Bus Interface (34), that interacts with the cache unit.
5. a CMU Update Unit (35), which modifies the CMU state based on "evict" and "filled" notices.
6. a CPU interface (36), which operates on the setowner and getusage instructions issues by the CPU.

A side effect is that the CMU can easily keep track of other information otherwise tied into the cache core hardware itself. For instance, by simply counting the notification requests, the CMU can provide actual cache miss accounting information.

Figure 4:
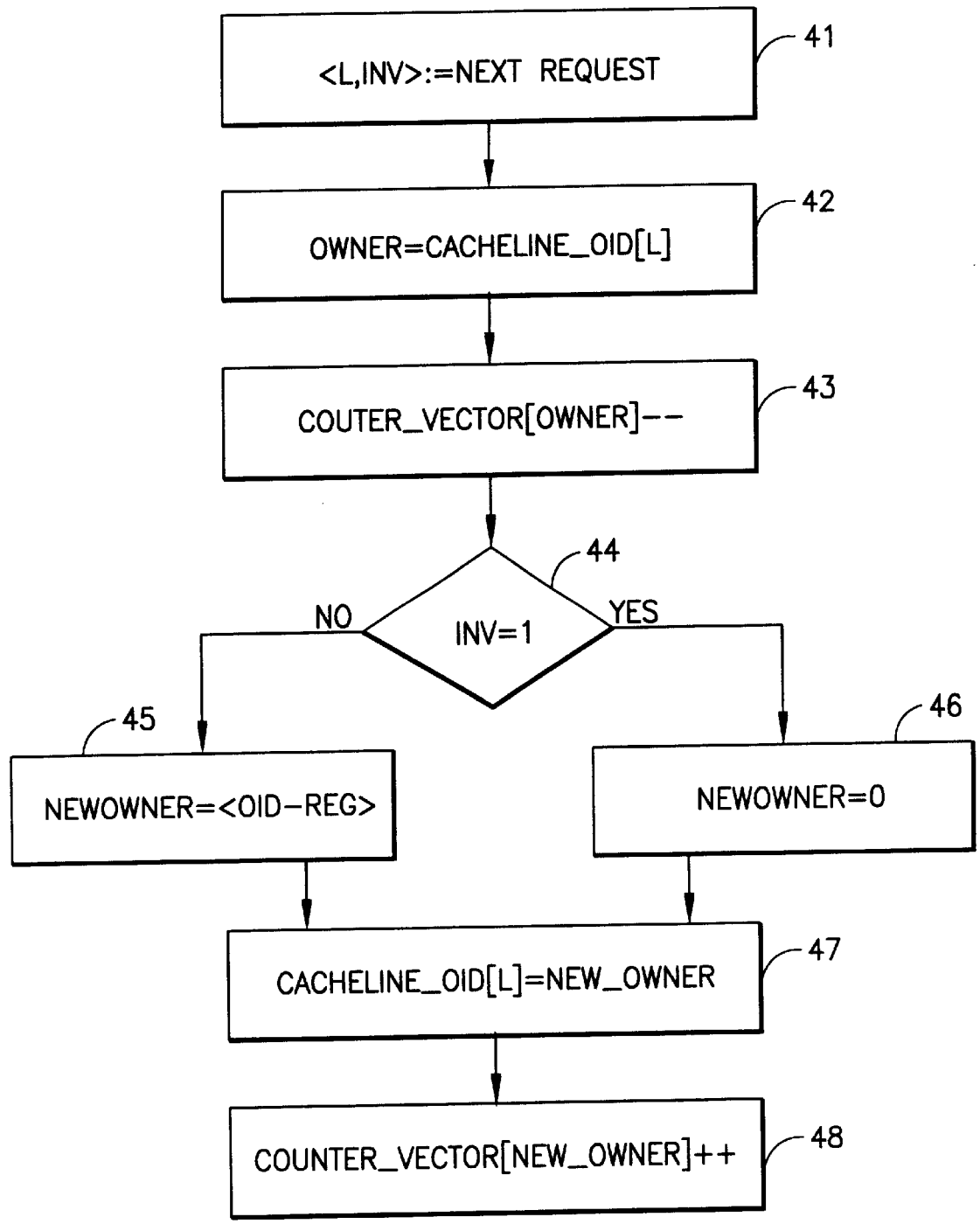
FIG. 4 schematically illustrates the cache monitoring unit update operation in accordance with this invention.

The operation of the CMU Update Unit (35) is to maintain the proper count and ownership of cachelines. As shown in the diagram of FIG. 4, the following flow of operation is pursued by the CMU Update Unit:

(41) Retrieves the next notification request<L,Inv>from the $C^3$-Bus Interface (34)
(42) Fetch from the cacheline-oid vector (32) the current owner of the cacheline L,
(43) decrement the counter_vector (33) at the just determined owner's entry.
(44) in case the Inv signal is raised, the new_owner is set to be "0" indicating an invalidate(46), otherwise the new_owner is determined by the content of the oid-reg (45).
(47) set the owner of cacheline CLO(L) to be the new_ owner.
(48) increment the counter_vector (34) of the new_ owner.

The choice of MAX_OID is dependent on various system parameters, such as the number of cachelines NUM_CL and the cacheline size CLS and the number of threads and processes. The following will give some estimates that are based on state of the art cache architectures and operating system parameters. The number of cachelines NUM_CL in a cache is of the order of thousands or ten-thousands not millions. For example, assume a cache of size 4 MegaBytes ($2^{22}$) with cacheline size of 128 Bytes ($2^7$) resulting in 32768 cachelines ($2^{15}$). Further assume an operating system that limits the number of threads that can be created to 4096 ($2^{12}$). Note that many commercial operating systems provide significantly less. Nevertheless, representing an oid in 2 bytes of storage allows up to $2^{16}$ different oids to be issued. Given above numbers this would require the cache design to provide 64KBytes of storage for the cacheline-oid-vector and with MAX_OID=4096 another 8KBytes for the counter_vector, totaling 72KBytes of additional storage. That is approximately 1.75% of the original storage. Though cache sizes will keep on growing, the effective percentage of total cache size required for the CMU extension will likely drop as the cacheline size will likely grow as well. Thus the number of cachelines will not grow at the rate of the cache size itself, ultimately reducing the chip real estate the CMU requires relative to the overall cache chip real estate.

Nevertheless, the OS must be prepared to deal with the fact that oids can be a critical resource. This invention provides a method for handling more than MAX_OID threads. Two general approaches make sense, the first is static and puts threads into groups, the second is more dynamic and requires the OS to actively manage the assignment of oids over time.

In the static oid assignment approach, threads belonging to the same address space or process should be assigned a common oid. This has an advantage over random thread grouping, as threads belonging to the same process often share data and/or code, i.e. memory. It is also feasible to partition all threads of a process into several thread groups and assign a separate oid to each such group. In particular, if knowledge about the memory sharing of threads is available, those threads sharing much of their addressed memory should be assigned to a thread group with distinct oid. This limits the maximum number of processes or thread groups to MAX_OID.

The dynamic oid assignment approach recognizes the fact that in cache affinity scheduling only a limited number of threads can benefit, namely the one's that are enabled to run. Typically, many threads are in a disabled state, which over time will anyway diminish the thread's cache footprint. It is therefore a valid approach for the operating system to (i) reuse an oid of a thread or thread group if it has been disabled, (ii) reassign the oid to a different entity and (iii) once the thread or thread group has been reenabled, assign a new oid to it. In this case, MAX_OID limits the number of enabled ready to run threads in the system and not the overall number of threads, something most multiprocessor operating systems must do anyway because of internal resource constraints.

Either approach has its advantages and disadvantages, many of which depend on the workload that executes on these systems and thus a choice towards either a static scheme or dynamic scheme is orthogonal to this embodiment.

Though not limited to the following, most processor designs would provide the "setowner" and the "getusage"

instructions either as special purpose register instructions (similar to those of cache-line invalidate, or read-realtime-clock or retrieving/resetting the cache state (e.g. retrieve the number of cache misses)), or as load/store instruction, where the CMU register is mapped into some part of the physical address range of the processor.

As an example we show here a simple instruction sequence for an operating system for using the CPU-CMU interface for a register based instruction set and for memory mapped CMU registers. Those skilled in the art easily can map this example onto other instruction sets and/or special purpose registers. Without loss of generality, in this example, we assume that register r4 holds the address of a thread descriptor block, that OID_OFFSET describes some fixed offset in this block where the oid of this thread is stored, that the CMU_OID constant describes the physical address to which the CMU oid register is mapped, and the CMU_VEC describes the physical address to which the first entry of a CMU counter vector is mapped (2 bytes each entry).

As mentioned earlier, the scheduler preferably sets oid-reg at the time of a scheduling decision just before switching execution to the selected task using code similar to the following:

```
lds r3,r4(OID_      // load the threads <oid> 16-bit value into register r3
OFFSET)
ldw r5,@CMU_        // load address of the CMU_OID register
OID
stsx r3,0(r5)       // store 16-bit at 0-offset at the CMU_OID register
```

In order to perform cache affinity scheduling, the scheduler must establish the cache affinity for each thread as a function of the cache footprint and hence has to retrieve the latter one from the CMU.

```
lds r3,r4(OID_      // load the threads <oid> 16-bit value into register r3
OFFSET)
ldw r5,@CMU_        // load address of the CMU_OID register
VEC
shl r3,r3,1         // shift left by 1 position to get correct vector offset
ldsx r6,r3(r5)      // load the 16-bit content of counter_vector[oid]into r6
```

The cache footprint measurement is now stored in register r6 and can be combined with other scheduling priorities to derive an overall execution priority. This is described in the following.

We now demonstrate how to integrate the usage of the cache monitoring apparatus into an operating system scheduler. First, we describe the general and abstract algorithm shown in FIG. 5 and then in the more detail we describe the integration for a standard fair scheduler such as a UNIX scheduler shown in FIG. 6. Note, however, that the invention is not limited to these descriptions. Rather, those skilled in the art, should be able to derive the process of integration of the cache monitoring apparatus and basic algorithm of this invention into other scheduling algorithms.

Figure 5:
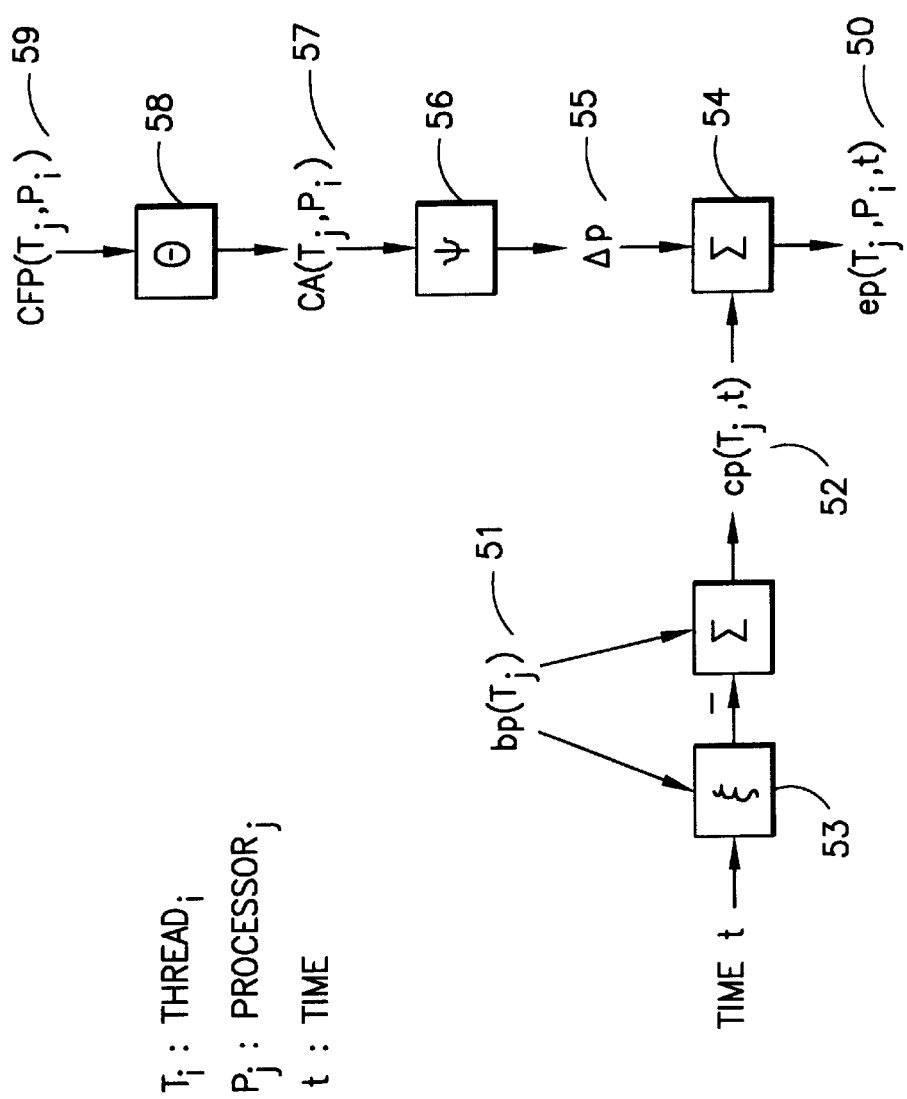
FIG. 5 graphically illustrates the general algorithm used to determine execution priority for thread on a given processor for the purpose of selecting a next thread to execute.

Ultimately, given a set of scheduling parameters, all schedulers derive for each thread some normalized number, we refer to as the execution priority, that allows the scheduler to compare these numbers in order to select the appropriate thread to execute next. Without loss of generality, we assume that higher numbers relate to preference. FIG. 5 shows the various parameters that contribute to the overall computation of an execution priority ep (50). A thread $T_j$ is created with a certain base priority $bp(T_j)$ (51). In order to provide some degree of fairness, a thread $T_j$ is not constantly scheduled at it's base priority $bp(T_j)$. Instead, with every time quantum it's current priority $cp(T_j,t)$ (52) at time t is computed by lowering the thread's base priority $bp(T_j)$ by some time t dependent amount $0 \leq \zeta(t) \leq bp(T_j)$ (53). Thus the current priority $cp(T_j,t)$ falls into some priority interval $\leq bp(T_j)$. Typically $\zeta(t)$ is implemented using some simple degradation scheme. In non cache affinity based scheduling, the execution priority is equal the current priority:

$$ep(T_j,t)=cp(T_j,t)=bp(T_j)-\zeta(T_j,t) \qquad \text{(Equation 1)}$$

Since under this invention cache affinity $CA(T_j,P_i)$ of thread $T_j$ to processor $P_i$ is taken into account when computing the execution priority for a thread $T_j$ on a given processor $P_i$, it implies that computation of the execution priorities for the same thread at the same time can yield different values on different processors. In particular, the current priority of a thread $cp(T_j,t)$ (52) (which is processor independent) is increased (54) at each scheduling point by $\Delta p$ (55) ($0 \leq \Delta p < \Delta P$). $\Delta P$ is the maximum number of priority levels by which a thread can be increased in this fashion. $\Delta p$ is computed from the cache affinity $CA(T_j,P_i)$ (57) via some monotonic function $\Psi(CA(T_j,P_i))$ (56). $CA(T_j,P_i)$ itself is computed from the cache footprint $CFP(T_j,P_i)$ (59) of thread $T_j$, as measured by the apparatus of this invention, via a monotonic function $\Theta(CFP(T_j,P_i))$ (58). This execution priority is hence a function of the base priority of a thread, time, and processor, the latter expressed by its affinity to the processor:

$$ep(P_i, T_j, t) = cp(T_j, t) + \Delta p \qquad \text{(Equation 2)}$$

$$cp(T_j, t) = bp(T_j) - \zeta(T_j, t)$$

$$\Delta p = \Psi(\Theta(CFP(P_i, T_j)))$$

Figure 6:
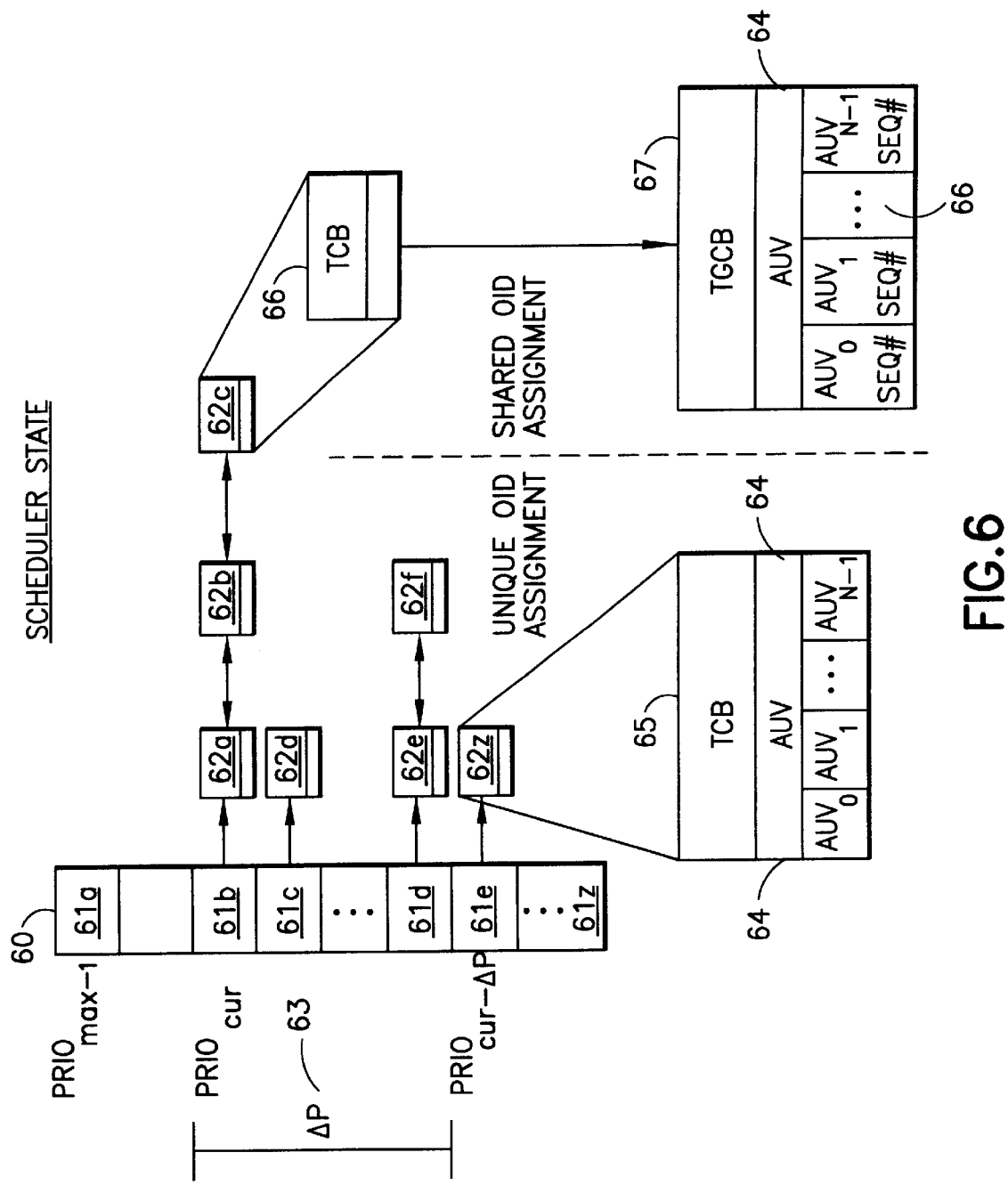
FIG. 6 schematically illustrates the scheduler and includes the dispatch queue and affinity vector for one of the threads.

To put this into a concrete context, we now show by example how to integrate the apparatus of this invention into a general fair UNIX based scheduler. Note, that this invention does not limit such integration to the one described herein. Rather those skilled in the art should be able to incorporate this strategy into other scheduling algorithms. References [2] is hereby incorporated herein by reference. Shown in FIG. 6 is the central dispatch vector or dispatch queue(60) which is the main part of the scheduling state. The scheduling state is shared by all processors and access to it is appropriately coordinated using locks or other well known mechanisms. This is necessary because the scheduler code executes on every processor when either the currently running thread voluntarily yields the processor to another thread or when the time quantum of the thread currently running on this processor has expired. The dispatch queue (60) is conceptually organized as a queue of queues $Q_i$, effectively as an array of queues $Q_i$ (61a through 61z), where each queue $Q_i$ links up a set of Thread Control Blocks TCB (62a through 62z), each keeping state, such as the thread's priority and saved registers. There are max priorities and hence max queues in this vector. A $TCB_j$ associated with thread $T_j$ is enqueued into $Q_i$ iff $T_j$ is ready to run and at the current time t its current priority $cp(T_j,t)$ is $PRIO_i$, where $0 \leq i < PRIO_{max}$. A thread $T_j$ represented by $TCB_j$ is created with a base priority $bp(T_j)$, with $PRIO_{max}/2 \leq bp(T_j) < PRIO_{max} - \Delta P$. The thread's $cp(T_j,t)$ is decremented with every time quantum until it reaches either 0 or $(bp(T_j)-PRIO_{max}/2)$. At that point, it is reset again to $bp(T_j)$.

FIG. 6 shows the priority interval of $\Delta P$ (63) which describes how much the scheduler is willing to increment a thread's execution priority based on a thread's cache affinity. For instance, assuming the reload transient model to determine cache affinity. If the reload transient is very small, as measured in the number of cachelines that must be refetched to establish the previous state, the scheduler will grant a priority adjustment $\Delta p$ (54) close to $\Delta P$ (63). If the reload transient falls below a critical threshold, the scheduler does not consider a thread for priority promotion. The $CA(T_j,P_i)$ as determined by $\Theta(CFP(T_j,P_i))$ (58) would be simply the difference between the cache footprint of the thread CFP $(T_j,P_i)$ and the cache footprint of the thread after its last execution $CFP(T_j,P_i)^{stop}$, namely the reload transient. The $\Psi(CA(T_j,P_i))$ function (56) can be a rather simple one (e.g. a shift and bit masking operation or a table lookup on the CA value of a thread).

Since any thread's priority can be increased by at most $\Delta P$ (63), the scheduler only has to inspect and/or calculate the cache affinity of the threads (62a ... 62f) of Queues $Q_{cur}$ to $Q_{cur-(\Delta P-1)}$ (61b ... 61d). Some information related to cache footprint or cache affinity must be stored on a per processor basis in order to derive the $CA(T_j,P_i)$ value. We refer to this per processor vector of values as the affinity utility vector AUV (64). Dependent on the oid assignment method (unique or grouped) the AUV should be associated with different data structures. In the unique assignment method the AUV should be associated with the thread control block TCB (65) itself. In the grouped oid assignment method the AUV should be associated with a shared data structure (66) that is related to the thread group, for instance the process control block in case all threads of a process share the same oid. The AUV (64) can assume various semantics as described in the following. In the time-stamp based algorithms, described in the prior art section, a bit vector is suffice as an AUV, raising the bit on which processor the thread ran last or if the last execution was too far in the past, the bit vector is nulled. In this case, each entry AUV[i] in the AUV vector is represented as Bit i and stores a binary cache affinity value. In the case of the reload transient model, the AUV[i] stores the cache footprint of the thread when it stopped last executing on processor $P_i$.

When the scheduling algorithm executes on processor $P_i$ (e.g. due to voluntary yielding of the currently running thread or due to a timer interrupt), the scheduler must inspect all threads $T_j$ of Queues $Q_{cur}$ to $Q_{cur-\Delta p}$, and increase their $cp(T_j,P_i)$ by $\Psi(\Theta(CFP(T_j,P_i)))$ and determine the maximum. In order to obtain the $CA(T_j,P_i)$ value for all threads, the scheduler first must retrieve for each thread $T_j$ the cache footprint by invoking "getusage($T_j$.oid)" for each of these thread.

Hence, multiple threads with approximately the same current priority will tend to be repeatedly scheduled on the same processors they ran on before, resulting in improved performance. The degrading of the current priority $cp(T_j,t)$ by $\zeta(T_j,t)$ means that the execution priority of even threads with very high affinity will eventually fall beneath the execution priority of threads with lower cache affinity, ensuring the fair and responsive scheduling of processors.

We now describe methods to maintain the cache affinity utility state and examine this state in order to reduce the number of interactions with the cache monitoring unit. Such reduction becomes important, if the overhead of querying the CMU is significant. Non of these methods is universally applicable, but instead they are dependent on the oid assignment algorithm chosen.

In the case that each thread maintains a unique oid the following optimization can be applied. The data structures related to this case are shown in (65). To one skilled in the art it is obvious that for a thread with unique oid, neither the cache footprint $CFP(T_j,P_i)$ nor the cache affinity $CA(T_j,P_i)$ of that thread towards a processor $P_i$, can increase if the thread does not run on $P_i$. Hence, it is sufficient for the scheduler to (a) compute $CA(T_j,P_i)^{last}$ at the end of a time quantum for the last run thread $T_j$ and (b) recompute $CA(T_j,P_i)$ during the thread selection phase if and only if $$cp(V_j)+\Psi(CA(T_j,P_i)^{last})>epmax, \qquad \text{(Equation 3)}$$

where epmax is the maximum execution priority found so far. New threads in this scheme should have there $CA(T_j,P_i)^{last}$ stored to a maximum. This algorithms leads to the behavior that for threads with low affinity, the CFP is refetched ("getusage") only a limited time (typically only once) since each refetch guarantees that the newly computed $CA(T_j,P_i)^{last}$ will be smaller. For threads with high cache affinity, the CFP will be refetched more frequently during the scheduling process.

In the case of thread grouping (66), above assumptions do not hold. However, the number of CMU requests at scheduling time can be reduced to the number of thread groups that are represented in the set of queues $Q_{cur}$ to $Q_{cur-(\Delta P-1)}$ (61b ... 61d). The per processor vector AUV is stored in a separate data structure (67) common to all threads of the same thread group, e.g. the process descriptor block. Furthermore, a time stamp, preferably a per processor sequence number (66) that is incremented every scheduling attempt, indicates the last time the CFP was read on a given processor for the group descriptor block identified by oid. Every scheduling cycle the CFP for a given thread group has to be read only once, that is when it's sequence number (66) does not match the current sequence number of the scheduling cycle.

In the case that neither of above optimization is desired, the following approximation can be used. It is applicable to both the unique oid and the grouped oid assignment method. Rather than accessing the cache footprint for an eligible thread or thread group on every single scheduling cycle, the scheduler could for a given thread or thread group $T_j$ obtain the $CFP(T_j,P_i)$ periodically, e.g. every n-th scheduling cycle. In all the other scheduling cycles, the scheduler can use approximations of the CFP as described in the prior art section. For instance, in the reload transient method, the scheduler could use cache miss information, which has to be read only once per scheduling cycle and use the markov chain to estimate the change to the $CFP(T_j,P_i)$ based on the number of cache misses since the last time the $CFP(T_j,P_i)$ was read. This introduces an estimation factor back into the scheduling algorithm; however, as compared to scheduling practices described in the prior art section, this method does not suffer the same problems as those introduced in the prior art section. First, because the $CFP(T_j,P_i)$ is mapped to only a few potential $\Delta p$'s, CFP values close to each other will most likely map to the same $\Delta p$. Hence, small errors in estimating $CFP(T_j,P_i)$ do not have any consequences. Since the estimated $CFP(T_j,P_i)$ value is periodically reset to the actual measured one $CFP(T_j,P_i)$, small errors can not accumulate to larger ones, that actually do have an effect on the outcome of the $\Delta p$ computation.

What is claimed is:

1. In a computer system, having a plurality of processors with each processor having at least one associated cache, a method of scheduling threads on each processor comprising:
   a. measuring a cache footprint for each of said threads for each of said processors by measuring the number of active cachelines that are fetched by said each thread from said each cache wherein said number of active cachelines fetched by a thread is measured by maintaining:
- (i) a per cache ownership identifier register indicating which thread owns cache lines that are fetched into said cache;
- (ii) a per-cacheline owner identification, indicating the owning thread of each of said cachelines;
- (iii) a per cache counter vector, where each component of said vector indicates said cache footprint that one of said threads has for a corresponding one of said caches; and
- (iv) a per cache method to retrieve the content of the counter vector for each of said threads; and b. determining an affinity for each of said threads for each of said processors by using its respective cache footprint determined in step a, wherein execution of each of said threads on each of said processors is scheduled for execution at least in accordance with its affinity.

2. A method as recited in claim 1, wherein said cache footprint measurement is updated with every cache miss.

3. A method as recited in claim 1, wherein a number of said threads can exceed the size of the counter vector.

4. A method as recited in claim 1, wherein each of said threads is scheduled for execution to a processor by assigning an execution priority which is a function of its affinity to latter said processor.

5. A method as recited in claim 4, wherein for each of said threads, said execution priority is a combination of a per thread user assigned base priority, time and cache affinity.

6. A method as recited in claim 1, wherein a scheduler executing on one of said processors can base scheduler's determination of whether one of said threads yields a highest execution priority on said one thread's previously computed affinity instead of recomputing an execution priority for said thread every scheduling cycle.

7. A program storage device readable by a machine, tangibly embodying a program of instructions executable by the machine to perform method steps for scheduling threads in computer system having a plurality of processors, with each processor having at least one associated cache said method steps comprising:

a. measuring a cache footprint for each of said threads for each of said processors by measuring the number of active cachelines that are fetched by said each thread from said each cache wherein said number of active cachelines fetched by a thread is measured by maintaining:
- (i) a per cache ownership identifier register indicating which thread owns cache lines that are fetched into said cache;
- (ii) a per-cacheline owner identification, indicating the owning thread of each of said cachelines;
- (iii) a per cache counter vector, where each component of said vector indicates said cache footprint that one of said threads has for a corresponding one of said caches; and
- (iv) a per cache method to retrieve the content of the counter vector for each of said threads; and b. determining an affinity for each of said threads for each of said processors by using its respective cache footprint determined in step a, wherein execution of each of said threads on each of said processors is scheduled for execution at least in accordance with its affinity.

* * * * *